Patented Aug. 2, 1932

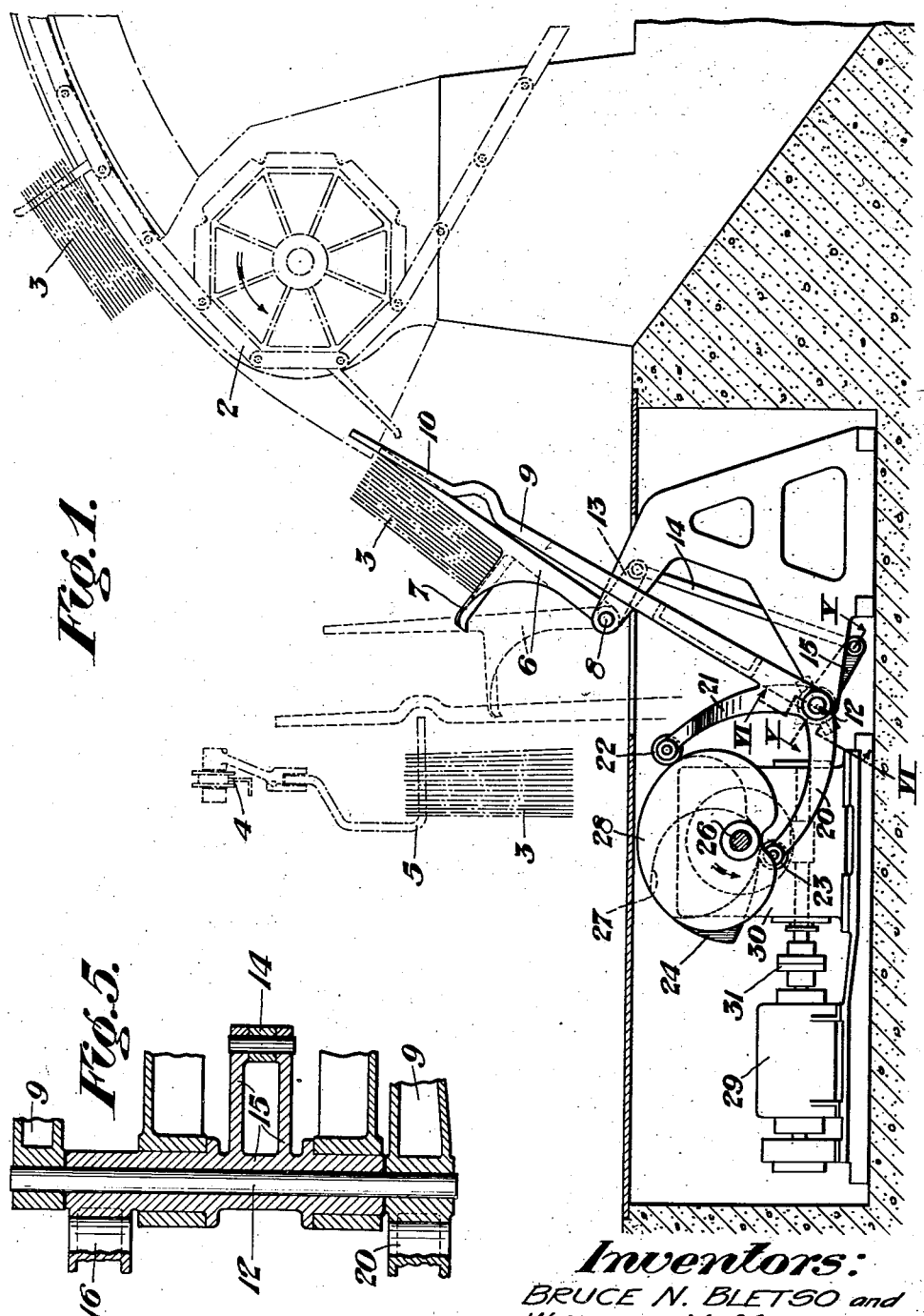

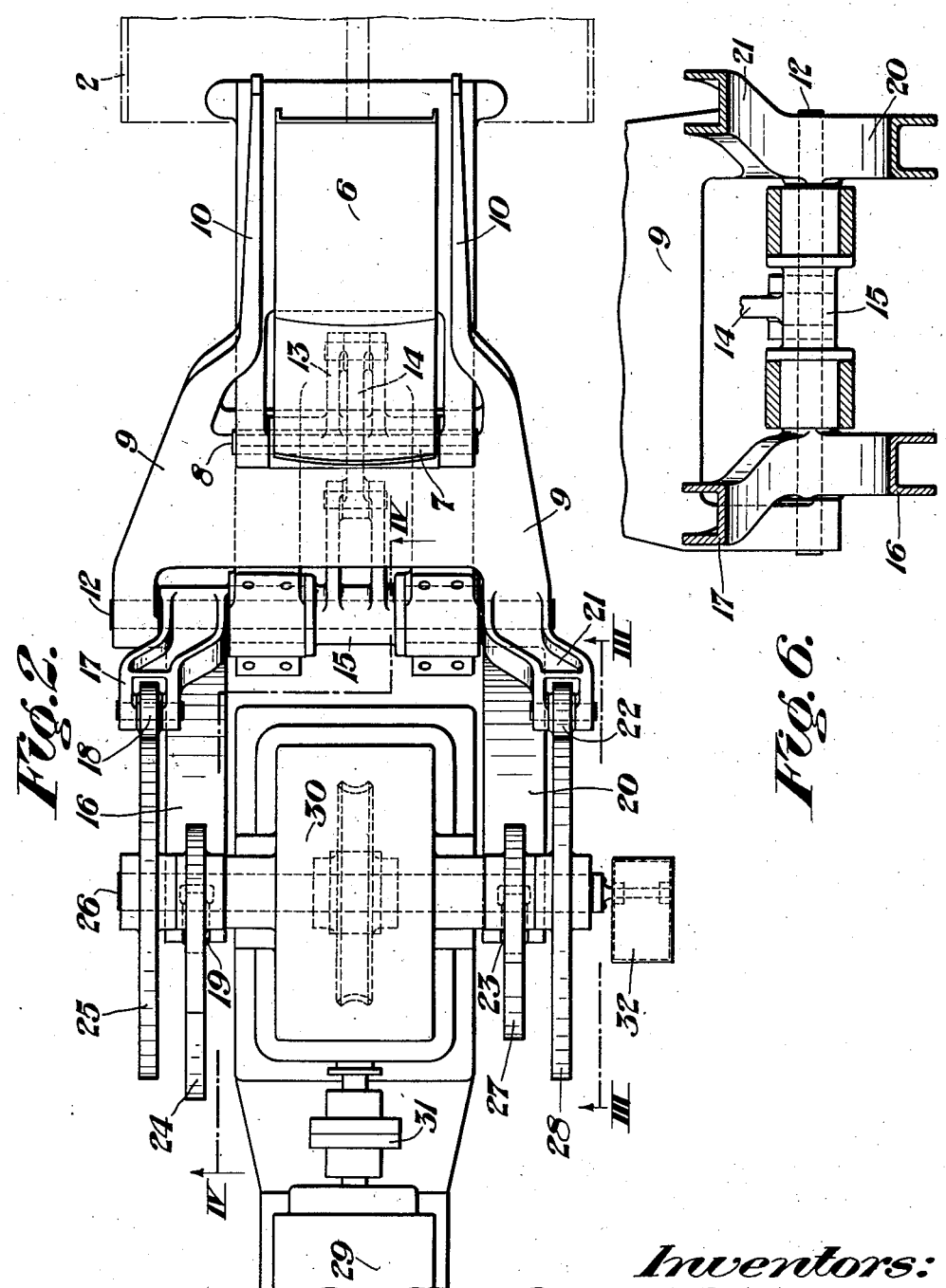

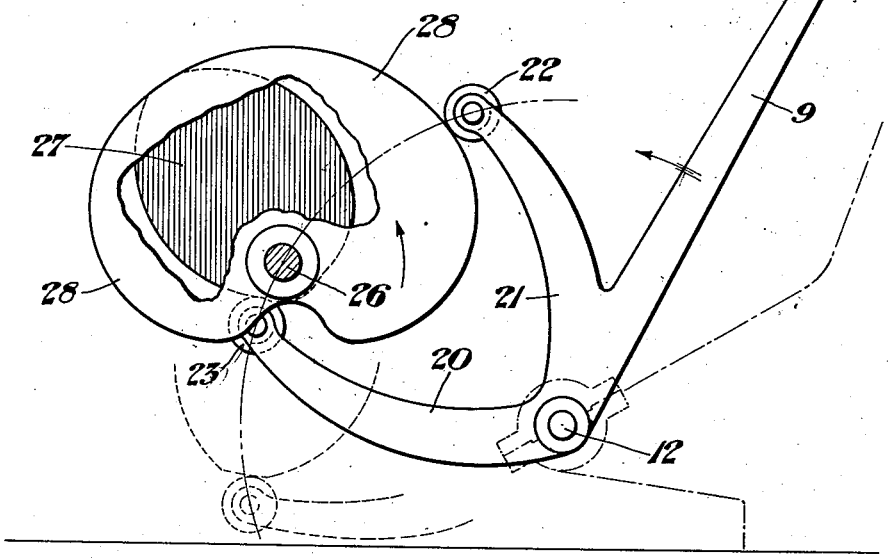
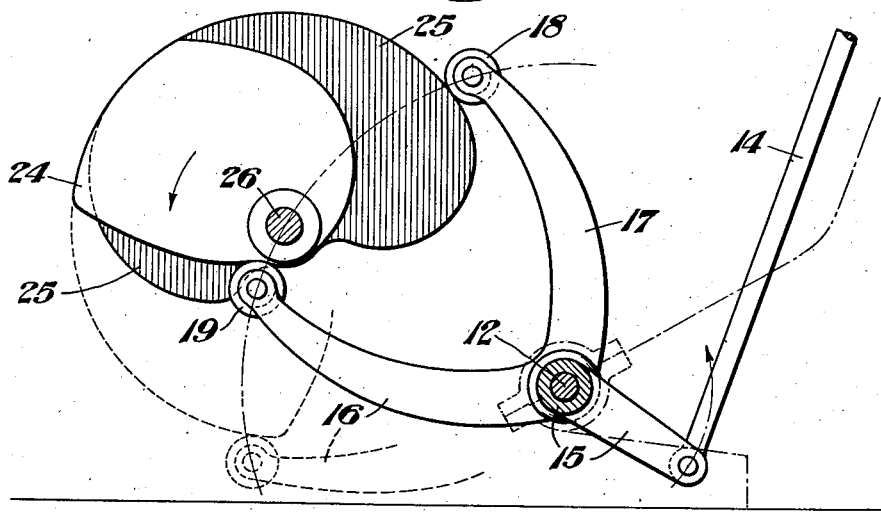

1,869,354

UNITED STATES PATENT OFFICE

BRUCE N. BLETSO, OF CLEVELAND HEIGHTS, AND WALTER V. MAGEE, OF LAKEWOOD, OHIO

ROD BUNDLE TRANSFER MECHANISMS

Application filed September 12, 1931. Serial No. 562,576.

Our invention relates to rod bundle transferring machines especially adapted for use between an endless rod bundle conveyer and a second conveyer spaced therefrom, our object being to provide a new and useful machine of the above type for automatically receiving rod bundles from an endless conveyer and transferring them to a second conveyer. Other objects may later become apparent.

Our invention is characterized by having a rod bundle receiving member arranged for swinging movement from one conveyer to another and a rod bundle engaging member arranged for swinging movement alined with the movement of this first named member, so that by imparting swinging motion to each of these members a rod bundle may be carried from one conveyer to another and deposited on the second conveyer by swinging the bundle engaging member beyond the first member. It is further characterized by the use of a plurality of cams and levers which are arranged to swing the bundle receiving member from one conveyer to another and to pause at the second conveyer, at the same time swinging the bundle engaging member back and forth substantially therewith but with a greater swing so as to pass beyond and then return to the carrying member during its pause.

Figure 1 is a side elevation of one form of this invention.

Figure 2 is a top plan view of an enlarged detail showing of Figure 1.

Figures 3 and 4 are partially cross-sectioned enlarged side views of details shown on lines III—III and IV—IV of Figure 2, respectively.

Figure 5 is a cross-section on the line V—V of Figure 1.

Figure 6 is a cross-section taken on the line VI—VI of Figure 1.

Having reference to these drawings, which illustrate a specific example of our invention, there is shown an endless conveyer 2 carrying rod bundles 3, and a track conveyer 4 having loading hooks 5. It is necessary to load the rod bundles 3 as they are delivered from the conveyer 2 onto the hooks 5. This is done by means of the rod bundle transfer member forming the subject of this invention.

In this case our invention consists of a rod bundle receiving member 6 having a platform 7 for positioning the rod bundles and a pivoted end 8 so that it may swing from one conveyer to the other, as is indicated by dotted lines. A rod bundle engaging member 9, having a pair of arms 10 for straddling the bundle receiving member 6, has its lower end pivoted on a shaft 12 so that it also may swing from one of the conveyers to the other. The member 6 has a lever 13 fixed to its lower end, which is connected, through a rod 14, to a second lever member 15 which is pivotally carried by the shaft 12. This lever member 15 carries a pair of arms 16 and 17 whose outer ends are provided with bearing rollers 18 and 19, and the member 9 carries a second pair of arms 20 and 21 having bearing rollers 22 and 23 at their outer ends.

A pair of cams 24 and 25 are carried by a shaft 26 so as to bear against the bearing rollers 18 and 19 of the two arms 17 and 16, and have their bearing faces constructed to swing the member 6, through the lever 13, rod 14 and lever member 15, from a point adjacent the conveyer 2 to a point adjacent the hook 5 of the conveyer 4, where it pauses or hesitates and then returns to its starting point. The cam 24 operates against the roller 19 and arm 16 during the first cycle, and the cam 25 operates against the rollers 18 and lever 17 on the return cycle, so that positive action is insured in both directions. A second pair of cams 27 and 28 are also carried by the shaft 26 so as to bear against the rollers 22 and 23 carried by the arms 21 and 20, and have their surfaces constructed so that the member 9 moves substantially with the member 6 until the latter pauses, the member 9 continuing past this point and returning during this pause, after which the two members move back to their starting position. The double cams and arms also insure positive operation.

The shaft 26 is shown driven by an electric motor 29 through a gear reduction box 30 and coupling 31. The shaft 26 of this box 30 operates a limit switch 32 arranged in circuit so that the shaft 26 will make a complete revolution and stop. It may be found preferable to arrange an electric interlock between the conveyer 2 and motor 29 to prevent operation when the various parts are not in proper position, no such circuit being shown because this may be accomplished by any one of a number of well known methods.

In operation it is to be assumed that the parts are in the position illustrated in the drawings. A rod bundle 3 has just been received by the member 6 from the conveyer 2, and is retained in position by the platform 7. The motor 29 is now operated to revolve the shaft 26 one complete revolution, the limit switch 32 automatically accomplishing this.

The four cams revolve so as to swing the members 6 and 9 towards the hook 5 of the conveyer 4 substantially together until a point adjacent the hook 5 is reached by the member 6 when it pauses, this being accomplished by the shape of the cams 24 and 25, and the member 9 continues therebeyond. The arms 10 then force the rod bundle 3 off of the platform 7 and onto the hook 5, returning to member 6, from which position the two members return substantially together to the starting point.

The fact that these members are pivoted at different positions prevents them from moving exactly together. The operation of the machine is automatic throughout and its construction is simple and strong. The example shown is positioned beneath the level of the floor in a pit for the purpose of getting it out of the way of workmen who must move about the machine.

We have shown a specific example of our invention in accordance with the patent statutes and not with the intention of limiting its scope exactly to this form, except as defined by the appended claims.

We claim:

1. In combination with an endless rod bundle conveyer and a second conveyer spaced therefrom, a rod bundle receiving member arranged for reciprocation from a point adjacent one of said conveyers to a point adjacent the other, and a rod bundle engaging member arranged for alined reciprocation with and beyond said first named member.

2. In combination with an endless rod bundle conveyer and a second conveyer spaced therefrom, a rod bundle receiving member arranged for swinging movement from one of said conveyers to the other, a rod bundle engaging member arranged for swinging movement alined with the movement of said first named member, means for swinging said first named member between points adjacent said conveyers and means for swinging said second named member substantially with said first named member between said points and beyond the point adjacent said second conveyer.

3. In combination with an endless rod bundle conveyer and a second conveyer spaced therefrom, a rod bundle receiving member arranged for swinging movement from one of said conveyers to the other, a rod bundle engaging member arranged for swinging movement alined with the movement of said first named member, a plurality of levers arranged to swing said members, and a plurality of cams constructed and arranged to operate said levers to swing said members substantially together between points adjacent said conveyers and to swing said second named member beyond the point adjacent said second conveyer.

4. In combination with an endless rod bundle conveyer and a second conveyer spaced therefrom, a rod bundle receiving member having its lower end pivoted so that this member may swing from one of said conveyers to the other, a rod bundle engaging member having its lower end pivoted so that this member may have swinging movement alined with the movement of said first named member, a two armed lever arranged to swing said first named member, a cam contacting each arm of said lever and constructed and arranged to cause the same to swing said first named member between points adjacent each of said conveyers and to pause at the point adjacent said second conveyer, a second two armed lever arranged to swing said second named member, and a cam contacting each of the arms of said second lever and constructed and arranged to cause the same to swing said second named member substantially with said first named member between said points and beyond the point adjacent said second conveyer while the latter member pauses thereat.

5. In combination with an endless rod bundle conveyer and a second conveyer, a rod bundle receiving member arranged to swing from one of said conveyers to the other, and a rod bundle engaging member having a pair of spaced arms and arranged for swinging with and beyond said first named member so that the arms straddle the same.

6. In combination with an endless rod bundle conveyer and a second conveyer spaced therefrom, a rod bundle receiving member having its lower end pivoted so that this member may swing from one of said conveyers to the other, a lever fixed to the lower end of said member, a second lever, a rod connecting said levers, a shaft mounting said last named lever, a two armed lever fixed to said last named lever, rotatable cams each contacting one of the arms of said two armed lever and constructed and arranged to move the same downward and then upward with a pause between these motions, a rod bundle engaging member mounted on said shaft so that it may swing in a direction alined with that of said first named member, a second two armed lever fixed to said last named member, rotatable cams each contacting one of the arms of said second named two armed lever and constructed and arranged to move the same downward with said first named two armed lever and to continue downwardly therebeyond and then return during the pause of the latter and then to move upwardly therewith, and means for rotating all of said cams together.

In testimony whereof, we have hereunto set our hands.

BRUCE N. BLETSO.
WALTER V. MAGEE.